Aug. 4, 1953   H. W. IBBOTT   2,647,402
FLOW METERING MECHANISM
Filed May 5, 1947
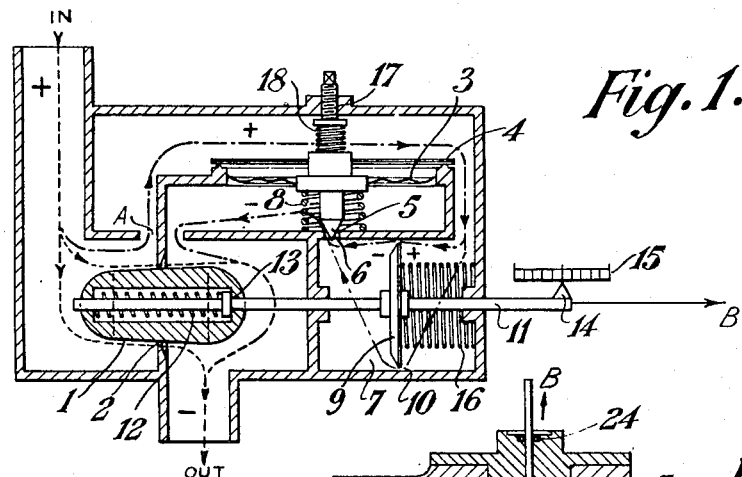
Fig. 1.
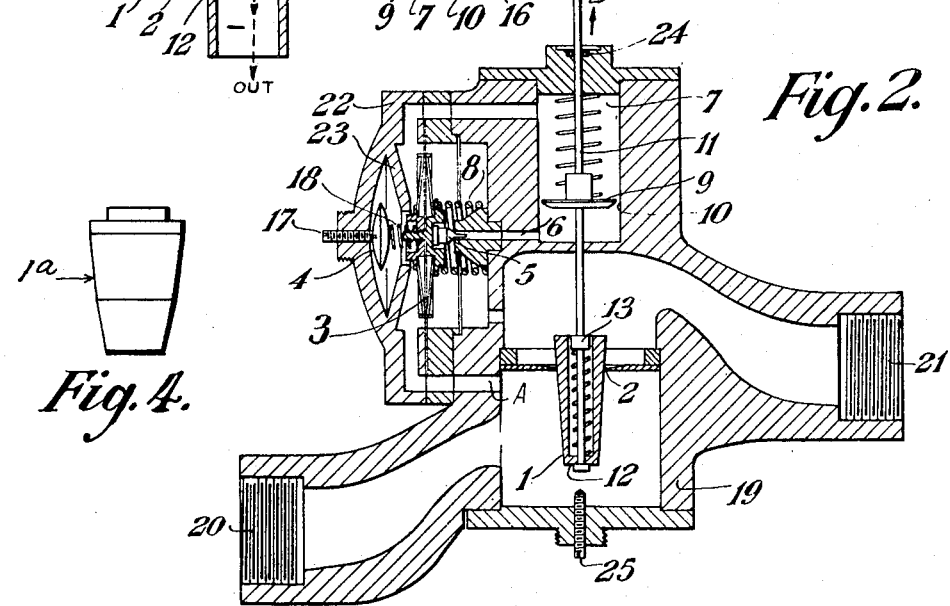
Fig. 2.
Fig. 4.
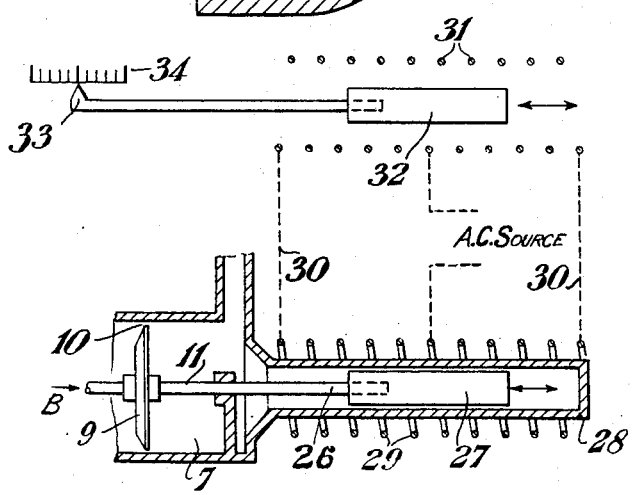
Fig. 3.
Inventor:
Harold W. Ibbott,
By his attorneys:
Baldwin & Wight Patented Aug. 4, 1953

2,647,402

UNITED STATES PATENT OFFICE 2,647,402

FLOW METERING MECHANISM

Harold William Ibbott, Watford, England, assignor to Negretti & Zambra Limited, London, England, a company of Great Britain Application May 5, 1947, Serial No. 746,004
In Great Britain May 16, 1946

9 Claims. (Cl. 73—210)

This invention relates to improvements in flow metering devices. It has a particular application to aircraft instruments, but is not restricted to this particular field, the design of the instrument being such that it may be used in any application where it is desired to measure a fluid flow.

The basic equation for the rate of flow using an orifice device is:

$Q = KA\sqrt{h}$ where $Q$ is the rate of flow.
$K$ is a constant.
$A$ is the area of the orifice.
$h$ is the differential pressure across the orifice.

It is obvious that there are two possibilities for measuring $Q$. The area may be constant and the differential used as in the orifice type of instrument, or the area $A$ may be varied and the differential $h$ kept constant. The latter types of instrument are generally known as the "head-Area" types, since a float moves up and down a shaped-tube altering the area between the edge of the float and the walls of the tube. The position of the float in the tube gives an indication of the flow. In all these types the weight of the float or plug enters into the design and all must be used in a vertical position.

In the present invention, the principle of constant differential across an orifice is used, but in a more advantageous manner, since the shaped tube is dispensed with, and the instrument is not restricted to the vertical position. It has greater accuracy due to its principle of working.

The invention is characterised by movable means adapted to varying the effective area of the orifice and actuated by a relay operated by a pressure-responsive device which is subjected to the differential, the relay functioning so as to restore a changed differential to its original value, and means being provided for indicating, recording or using to effect a control, movements of the movable means.

The invention may accordingly comprise a shaped plug mounted on a spindle and projecting through a fixed orifice, the variable area being obtained between the contour of the plug and the inner edge of the orifice. The contour may be so arranged as to give straight line or any other convenient scale on the metering instrument. The fluid, which is forced to flow through the annular area between the orifice and plug, sets up a differential pressure, and for the purposes of explanation the pressure on the inlet side may be designated positive, and that on the outlet side negative, it being understood that "positive" and "negative" are purely relative terms. If the flow changes the first tendency is for the differential pressure across the orifice to change, one result of which is that the positive pressure increases or decreases according to the way the flow has changed. This change in positive pressure is used to operate through a pressure-responsive device an auxiliary valve of the diaphragm type, which in turn causes the operation of a fluid-operated prime mover to which the plug spindle is fixed. This prime mover may be a piston device, or any other suitable device which produces movement from a change of fluid pressure. The operation of a prime mover causes the plug to move in the orifice, changing the annular area in such a way that it restores the differential across the orifice to its predetermined original value. When this happens, the auxiliary valve is released, the movement of the prime mover stops and the plug remains in a new position which is proportional to the new flow.

A pointer may be attached to a free end of the plug spindle and may thus be made to move over a scale to give an indication of the flow. Alternatively, the plug spindle may be used to vary an electrical resistance to give a form of transmission for electrical indication. It may be also used to operate an air transmission device and give an indication on a pressure operated instrument.

An important feature of the invention is the fact that a force or load acting on the plug spindle does not affect the working of the instrument. This can be seen at once from the fact that assuming the flow remains constant, a force tending to move the spindle will alter the annular area and in turn alter the differential. The mechanism will now be set in operation to restore the valve plug to its original position with the normal differential and so counteract the effect due to the force.

The invention is illustrated by way of example in the accompanying drawings in which:

Figure 1 shows diagrammatically the principle of the construction of the apparatus according to the invention.

Figure 2 is a sectional elevation of a preferred form of construction.

Figure 3 is a diagrammatic illustration of a modified form of a detail.

Figure 4 is an elevation of a double tapered plug.

According to the invention and with reference to Figure 1, a tapered plug 1 is arranged so that its movement will vary the effective area of the orifice 2 through which fluid may be considered as flowing from the side marked (+) to the side marked (−). A flexible diaphragm 3 in combination with a bimetal strip 4 operates a needle valve 5 which moves to open or close a port 6 situated in the wall of a cylinder 7. The bimetal strip 4 is responsive to temperature, and arranged to modify the controlled pressure difference across the orifice 2, to correct for changes of the density or viscosity of the metered fluid. For a particular fluid it may be arranged to render measurements independent of temperature either if flow is required in units of mass or of volume. The diaphragm is supported by a spring 8 so that the valve is normally open. The diaphragm and valve assembly is adjustable by means of a screw 17 which varies the compression of a spring 18 bearing on the head of the valve.

A small flow of fluid to the positive side of a piston 9 contained in the cylinder 7, by-passes the orifice 2 by way of a passage A. This flow is only a small fraction of the total flow through the apparatus, and is constant for any particular rate of flow. Accuracy of the apparatus is not therefore effected.

The piston 9 leaves a narrow annular space 10 between it and the cylinder wall, and is secured to a spindle 11 which passes through both ends of the cylinder. One end of the spindle has mounted thereon the tapered plug 1. This mounting is provided by a spring 12 compressed between the front of the plug and a collar 13 secured on the spindle. Should the pressure on the positive side of the plug rise to an excessive value, or the spindle become jammed, the plug will be free to move against the spring to keep the orifice 2 open. The other end of the spindle carries an index 14 moving over a scale 15. A light compression spring 16 is provided for returning the indicator to zero when the flow of fluid is stopped suddenly and the piston losses its source of power.

In operation, when fluid is flowing, there is always a force acting in the direction indicated by the arrow B, due to the fluid pressure on the tapered plug 1. This is normally balanced by the pressure difference acting in the opposite direction on the piston 9, the needle valve 5 being open. Supposing the flow of fluid increased, the differential existing across the metering orifice 2 increases so that the diaphragm 3 causes the valve 5 to close or restrict the port 6. This reduces or eliminates the pressure difference on the piston 9 so that the plug 1 will move to the right and thus increase the metering orifice 2 whereby the pressure differential is decreased. Accordingly the valve 5 will then lift and cause the pressure difference to be re-established on the piston 9 which will balance the force acting on the plug 1, the original differential across the metering orifice being restored and bring it to rest in a new position of equilibrium. The extent of the movement of the plug to its new position will then indicate, by means of the index 14 on the scale 15, the new rate of flow through the metering orifice.

On the other hand, if the flow of fluid decreases, the differential existing across the metering orifice 2 will decrease, so that the diaphragm 3 will cause the valve 5 to open still further the port 6. This increases the pressure difference on the piston 9 so that the plug 1 will move to the left and thus decrease the metering orifice 2, whereby the pressure differential is increased. Accordingly the diaphragm 3 will then cause the valve 5 to restrict the port 6 and cause the pressure difference to be re-established on the piston 9 which will balance the force acting on the plug 1 and bring it to rest in a new position of equilibrium. The extent of the movement of the plug, when equilibrium is restored will then indicate, by means of the index 14 on the scale 15, the new rate of flow through the metering orifice.

The apparatus illustrated in Figure 2 and which includes like parts, correspondingly numbered, to those shown in Figure 1, comprises a casing 19 having a fluid inlet 20 and outlet 21. The diaphragm 3 and its associated parts are housed in a side extension 22 of the casing 19. The bimetal element 4 is in direct contact with the adjusting screw 17 and the spring 18 is interposed between the element and the head of the needle valve 5. An internal flange 23 forms a stop for limiting the expansion of the diaphragm 3. The spindle 11 is mounted vertically, with a fluid seal 24 provided in the head of the cylinder 7 to prevent leakage of fluid past the spindle. An adjustable stop 25 is provided at the bottom of the casing 19 to limit the travel of the plug 1 to a point adjusted to correspond with the zero mark on the scale or other indicator, not shown in Figure 2.

Figure 3 illustrates electrical means for transmitting to a distance indications of the movement of the spindle. An extension 26 of the spindle 11 carries an iron core 27, slidable within a closed extension 28 of the cylinder 7. This eliminates the provision of a sealing gland for the spindle, which is important when the metered fluid is under high pressure. The extension 28 is surrounded by an inductive winding 29 connected at its ends by electric leads 30 to a distant inductive winding 31, the windings 29 and 31 being connected at their centres to a source of A. C. supply. Inside the winding 31 is a slidable iron core 32 carrying an index 33 movable over a scale 34.

In this way the distant index 33 is caused to move in accordance with the movements of the spindle 11.

For a linear scale, the contour of the plug should be strictly parabolic. The difference between a truncated cone and a truncated parabola is so small in practice that a conical plug may be used without loss of accuracy. Since the shaping of the plug determines the type of scale, it is apparent that any part of the scale may be brought into prominence as desired. For example, the plug may be shaped as shown at 1ª in Figure 4 so as to have two tapers, one taper corresponding with the normal fuel consumption rate of an aircraft engine say 30–60 gallons per hour and the other taper corresponding with the remainder of the scale up to say 150 gallons per hour for take off. Since the normal fuel consumption is the most important part of the range, the plug may be so tapered that 30–60 gallons per hour occupies the major part of the scale, with 60–150 gallons per hour occupying a minor part.

What I claim is:

1. A flow meter comprising in combination a casing having an inlet and an outlet, a partition member formed with an orifice between said inlet and outlet, a tapered plug movable in said orifice to vary the effective area thereof, a cylinder, a piston connected to said plug and movable in said cylinder to actuate said plug, said piston being adapted to provide a fluid passage from one side thereof to the other, means providing a fluid passage connecting the space on one side of said piston to the inflow side of said orifice, means providing a fluid passage connecting the space on the other side of said piston to the outflow side of said orifice, a valve serving to control the flow of fluid through said latter passage, a pressure responsive device subjected to the differential fluid pressure across said orifice and coupled to said valve for adjusting said valve in response to a change in the said differential pressure, whereby the differential pressure on said piston which opposes the differential pressure on the plug is varied so that the plug is moved in the sense of restoring the differential pressure across the orifice to its original value, and means for measuring movements of the plug.

2. A flow meter comprising in combination a casing having an inlet and an outlet, a partition member formed with an orifice between said inlet and outlet, a tapered plug movable in said orifice to vary the effective area thereof, a cylinder, a piston connected to said plug and movable in said cylinder to actuate said plug, said piston being of smaller diameter than the bore of the cylinder, means providing a fluid passage connecting the space on one side of said piston to the inflow side of said orifice, means providing a second fluid passage connecting the space on the other side of said piston to the outflow side of said orifice, a valve serving to control the flow of fluid through said second passage, a pressure responsive device subjected to the differential fluid pressure across said orifice and coupled to said valve for adjusting said valve in response to a change in the said differential pressure, whereby the differential pressure on said piston which opposes the differential pressure on the plug is varied so that the plug is moved in the sense of restoring the differential pressure across the orifice to its original value, and means for measuring movements of the plug.

3. A flow meter comprising in combination a casing having an inlet and an outlet, a partition member formed with an orifice between said inlet and outlet, a tapered plug movable in said orifice, a spindle on which said plug is mounted, a spring connecting means between said plug and said spindle, a cylinder, a piston mounted on said spindle and movable in said cylinder to actuate said plug, said piston being of smaller diameter than the bore of said cylinder, means providing a fluid passage connecting the space on one side of said piston to the inflow side of said orifice, means providing a fluid passage connecting the space on the other side of said piston to the outflow side of said orifice, a valve serving to control the flow of fluid through said latter passage, a pressure responsive device subjected to the differential fluid pressure across said orifice and coupled to said valve for adjusting said valve in response to a change in the said differential pressure, whereby the differential pressure on said piston which opposes the differential pressure on the plug is varied so that the plug is moved in the sense of restoring the differential pressure across the orifice to its original value, and means for measuring movements of the plug.

4. A flow meter according to claim 3, said measuring means comprising an index carried by said plug spindle and a scale over which said index moves.

5. A flow meter according to claim 3, said measuring means comprising electrical transmission means responsive to movements of said plug spindle.

6. A flow meter comprising in combination a casing having an inlet and an outlet, a partition member formed with an orifice between said inlet and outlet, a tapered plug movable in said orifice, a spindle on which said plug is mounted, a cylinder, a piston mounted on said spindle and movable in said cylinder to actuate said plug, said piston being of smaller diameter than the bore of said cylinder, a spring interposed between said piston and said casing and serving to urge said piston to move said plug towards said orifice, means providing a fluid passage connecting the space on one side of said piston to the inflow side of said orifice, means providing a second fluid passage connecting the space on the other side of said piston to the outflow side of said orifice, a valve serving to control the flow of fluid through said second passage, a pressure responsive device subjected to the differential fluid pressure across said orifice and coupled to said valve for adjusting said valve in response to a change in the said differential pressure, whereby the differential pressure on said piston which opposes the differential pressure on the plug is varied so that the plug is moved in the sense of restoring the differential pressure across the orifice to its original value, and means for measuring movements of the plug.

7. A flow meter comprising in combination a casing having an inlet and an outlet, a partition member formed with an orifice between said inlet and outlet, a tapered plug movable in said orifice, a spindle on which said plug is mounted, a spring connecting means between said plug and said spindle and urging said plug in an orifice-closing movement; a cylinder, a piston mounted on said spindle and movable in said cylinder to actuate said plug, a spring interposed between said piston and said casing and serving to urge said piston to move said plug towards said orifice, means providing a fluid passage connecting the space on one side of said piston to the inflow side of said orifice, means providing a second passage connecting the space on the other side of said piston to the outflow side of said orifice, a valve serving to control the flow of fluid through said second passage, means providing a restricted communication between the two cylinder spaces, a pressure responsive device subjected to the differential fluid pressure across said orifice and coupled to said valve for adjusting said valve in response to a change in the said differential pressure, whereby the differential pressure on said piston which opposes the differential pressure on the plug is varied so that the plug is moved in the sense of restoring the differential pressure across the orifice to its original value, and means for measuring movements of the plug.

8. A flow meter comprising in combination a casing having an inlet and an outlet, a partition member formed with an orifice between said inlet and outlet, a tapered plug movable in said orifice to vary the effective area thereof, a cylinder, a piston connected to said plug and movable in said cylinder to actuate said plug, said piston being adapted to provide a fluid passage from one side thereof to the other, means providing a fluid passage connecting the space on one side of said piston to the inflow side of said orifice, means providing a fluid passage connecting the space on the other side of said piston to the outflow side of said orifice, a valve serving to control the flow of fluid through said latter passage, a pressure responsive device subjected to the differential fluid pressure across said orifice and coupled to said valve for adjusting said valve in response to a change in the said differential pressure, whereby said plug is moved, means for measuring movements of said plug, and a temperature responsive element connected to said valve and serving to vary according to temperature changes of the fluid the response of the said pressure-responsive device.

9. A flow meter comprising in combination a casing having an inlet and an outlet, a partition member formed with an orifice between said inlet and outlet, a tapered plug movable in said orifice, a spindle on which said plug is mounted, a cylinder, a piston mounted on said spindle and movable in said cylinder to actuate said plug, said piston being of smaller diameter than the bore of said cylinder, a spring interposed between said piston and said casing and serving to urge said piston to move said plug toward said orifice, means providing a fluid passage connecting the space on one side of said piston to the inflow side of said orifice, means providing a second fluid passage connecting the space on the other side of said piston to the outflow side of said orifice, a valve serving to control the flow of fluid through said second passage, a pressure responsive device subjected to the differential fluid pressure across said orifice and coupled to said valve for adjusting said valve in response to a change in the said differential pressure, whereby the differential pressure on said piston which opposes the differential pressure on the plug is varied so that the plug is moved, means for measuring movements of the plug, and a temperature responsive element in contact with said valve and serving to vary according to temperature changes of the fluid the response of the pressure-responsive device.

HAROLD WILLIAM IBBOTT.

References Cited in the file of this patent
UNITED STATES PATENTS

| Number | Name | Date |
| --- | --- | --- |
| 916,831 | Bettinger | Mar. 30, 1909 |
| 1,057,621 | Cross | Apr. 1, 1913 |
| 1,487,402 | Roucka | Mar. 18, 1924 |
| 1,580,679 | Roucka | Apr. 13, 1926 |
| 1,770,912 | Clapp | July 22, 1930 |
| 2,052,022 | Fisher | Aug. 25, 1936 |